Jan. 5, 1971  H. KUHLMANN  3,552,896
FLASH UNIT

Filed March 2, 1967  2 Sheets-Sheet 1

INVENTOR.
HERMANN KUHLMANN
BY
AGENT

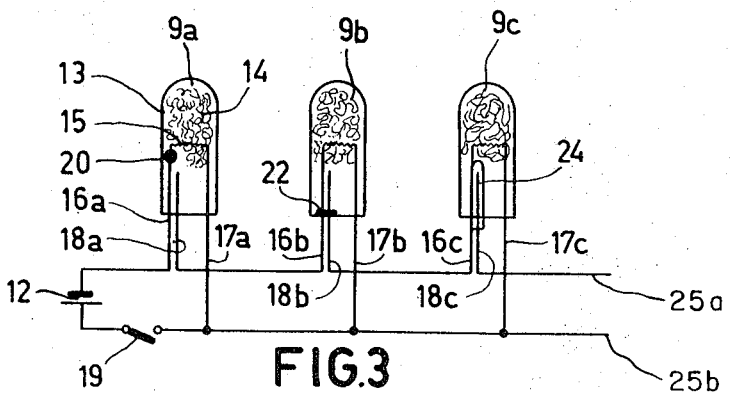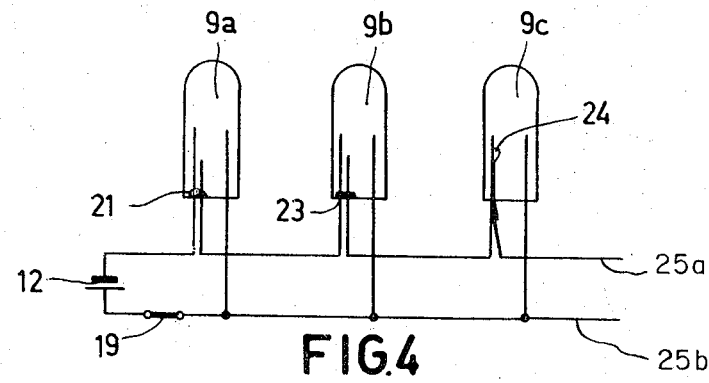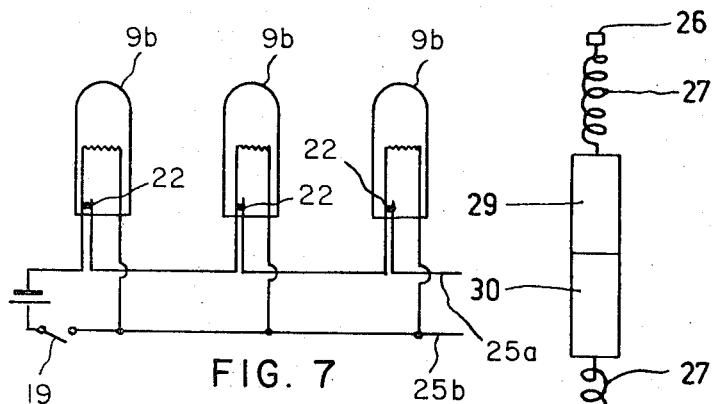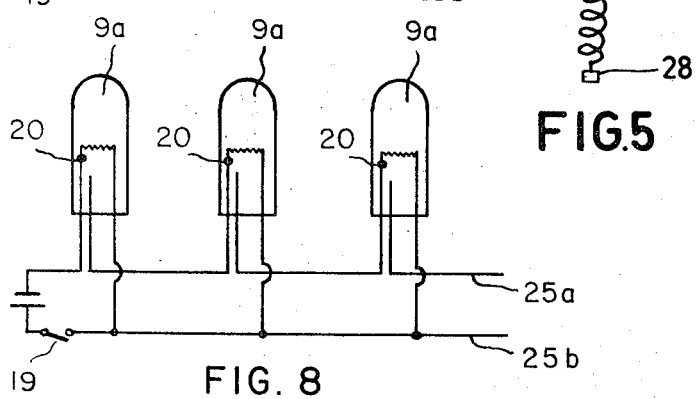

United States Patent Office

3,552,896
Patented Jan. 5, 1971

---

3,552,896
FLASH UNIT
Hermann Kuhlmann, Hamburg-Blankenese, Germany, assignor, by mesne assignments, to U.S. Philips Corporation, New York, N.Y., a corporation of Delaware
Filed Mar. 2, 1967, Ser. No. 620,047
Claims priority, application Germany, Mar. 2, 1966,
P 38,883
Int. Cl. F21k 5/02
U.S. Cl. 431—95    3 Claims

ABSTRACT OF THE DISCLOSURE

A flash lamp unit has a plurality of flash bulbs carried by a base for sequential ignition. Upon the ignition of each bulb, a junction means therein melts and flows to join a third electrode wire within the bulb to one of the first and second pole wires bridged by the filament in the bulb. This electrode is connected at its remote end to the first wire in an adjacent bulb to permit closing of its ignition circuit.

---

The invention relates to a flash unit comprising at least two flash bulbs arranged either beside or behind each other on a common support. The bulbs may be ignited one after the other and each comprise two pole wires leading to an ignition element. The invention further relates to flash bulbs for use in said flash unit.

In a known device of this kind four flash bulbs are arranged on a square support with a difference of 90° with respect to each other, the support comprising a contact member for inserting in a corresponding holder of a camera or an adapter. The four flash bulbs are connected to the contact member by separate current supply conductors. After the ignition of a bulb, the support must be moved 90° so that the next bulb becomes located in the direction of the picture and the current supply conductors of said lamp contact the holder contacts. For this purpose, however, the camera or the adapter must be provided with a device for rotating the lamp support. If this device is operated manually, the danger exists that the person who takes the picture forgets to rotate the lamp support further. If, however, the device for rotating is coupled, for example, to the transport mechanism for the film, a special camera is required for using said flash unit. At any rate, contact difficulties may occur during rotating the flash bulb support, so that the bulbs may not ignite.

In addition a flash unit known in which several flash bulbs are accommodated in a row behind each other and can be ignited after each other by means of a contact switching device which is controlled by an electro-magnetically operated switch which operates stepwise. However, this also requires a special construction of the flash unit.

In a flash unit of the type described in the preamble said drawbacks are avoided in that the support comprises flash bulbs having two pole wires provided with an ignition mechanism and an additional electrode. The additional electrode is connected electrically to a first pole wire of a next flash bulb in the support, and in which as a result of the actinic reaction during the ignition in a flash bulb the additional electrode in the flash bulb is permanently connected electrically to the first pole wire in the flash bulb and in which all the second pole wires are electrically connected together in the support.

The flash bulbs may be rigidly secured to the support, thus forming a throw-away unit. In order that all the bulbs are ignited one after the other each time when the current circuit is closed, without the support being displaced and without external contact switching, it is only necessary that the support is secured to the camera and connected to an electric energy source. The flash-bulb-support unit may be used with any camera. A separate contact switching device is not necessary since the switching is effected in the flash bulbs themselves.

The contact means may be low-melting point metal alloys, for example, Wood's metal. The low-melting point metal alloy is secured, for example, to the first pole wire and/or to the additional electrode in the form of a metal drop which, after burning of the flash bulb, flows between the first pole wire and the additional electrode.

Alternatively, the contact means may be a non-conductive mass which connects the first pole wire and the additional electrode and which becomes electrically conductive permanently after the action of heat upon it.

The contact means may also be a non-conductive mass of a photo-sensitive material which connects the first pole wire and the additional electrode together and which becomes permanently electrically conductive after a strong action of light upon it.

The contact means may furthermore consist of a thin metal tube secured to the first pole wire, which tube, under the action of the gas pressure occurring temporarily when the flash bulb burns, is compressed and contacted with the additional electrode.

The flash bulb support preferably comprises in known manner a contact member for securing the support in a corresponding contact holder of a camera. If the flash bulb support comprises a slide securable to a central contact of a holder, the slide preferably comprises in known manner an opposite contact for cooperating with the central contact.

It is alternatively possible to provide the flash bulb support with a contact nipple for receiving a coaxial plug of a camera synchronous cable. In this case, according to a further embodiment of the invention, an electric energy source for igniting the flash bulbs is accommodated in or on the synchronous cable. The electric energy source for igniting the flash bulbs is preferably arranged on the flash unit. The electric energy source for igniting the flash bulbs may also be accommodated in the camera in known manner. For example, the electric energy source in this case is a known piezo-electric element consisting, for example, of lead-zirconate-titanate.

The electric energy source may furthermore be accommodated in known manner in an adapter which comprises a slide for securing to a holder and a holder for securing the slide to a flash unit.

In order that the invention may readily be carried into effect, a few examples thereof will now be described in greater detail with reference to the accompanying drawings, in which FIG. 1 shows a camera with a flash unit according to the invention.

FIG. 3 is a circuit diagram of a number of flash bulbs used in the flash unit shown in FIGS. 1 and 2 before ignition, and FIG. 4 shows the flash bulbs after ignition.

FIG. 5 shows on an enlarged scale a synchronous cable for use in the unit shown in FIG. 1.

FIG. 7 is a circuit diagram similar to FIG. 3, but with all bulbs like 9b of FIG. 3. FIG. 8 is a circuit diagram similar to FIG. 7 but with all bulbs like 9a of FIG. 3.

Figure 1:
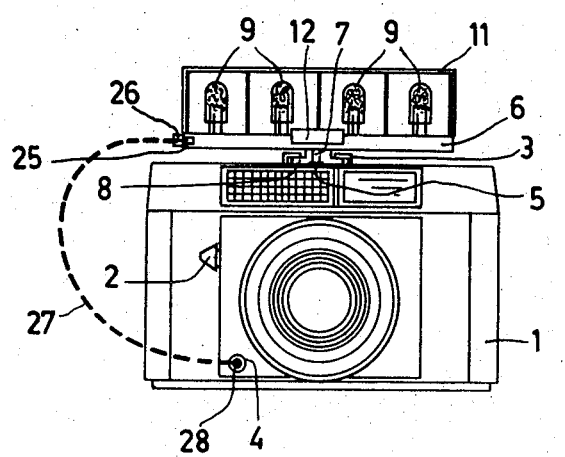

In FIG. 1, reference numeral 1 denotes a camera with a shutter release 2, a holder 3 and a flash light contact nipple 4. The holder 3 includes a central contact 5. On the holder 3, a slide 7 secured to a rectangular supporting plate 6 is mounted which includes an opposite contact 8 cooperating with the central contact 5 of the holder 3.

Figure 2:
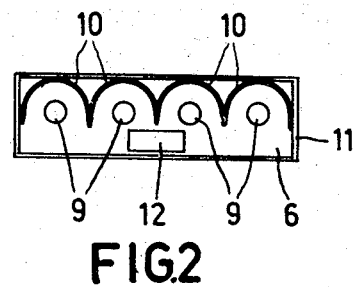
FIG. 2 is a plan view of the flash unit shown in FIG. 1.

A number of flash bulbs 9, in this case four, are rigidly secured to the supporting plate 6. Each flash bulb 9 includes a reflector 10 (FIG. 2). The flash bulbs 9 and the reflectors 10 are surrounded by a common hood 11 of transparent material, preferably a synthetic material which may be secured, for example, to the supporting plate 6. The supporting plate 6 furthermore comprises an electric energy source 12 for igniting the flash bulbs 9. The energy source 12 may be constructed so that it is made ready for operation only a short period of time prior to the ignition of the first flash bulb. The slide 7 with the opposite contact 8 is connected in known manner to the ignition current circuit of the bulb 9, the holder 3 has the central contact 5 connected electrically to the slide 7 and the opposite contact 8 connected to an ignition switch 19 (FIGS. 3 and 4) in the camera 1.

The supporting plate 6 with the slide 7, the flash bulb 9, the reflectors 10, the energy source 12 and the hood 11 constitute a throw-away unit which can be mounted substantially on any camera.

The interior construction of the flash bulb 9 and their connection to the supporting plate 6 will now be described with reference to FIGS. 3 and 4, in which, however, only three flash bulbs 9a, 9b and 9c are shown. Every flash bulb 9 includes a glass envelope 13 which is filled with an actinically reacting material, for example, zirconium wool. Each flash bulb comprises two pole wires 16 and 17 which lead to an ignition wire 15 provided with ignition paste. In addition every flash bulb 9 is provided with an additional electrode 18 which consists of a wire, sealed in the cap of the bulb 13. The additional electrode 18 of a flash bulb 9 is each time connected to the first pole wire 16 of the next flash bulb. All the second pole wires 17 are connected, through a switch 19 in the camera which is operated by the shutter release 2, to a pole of the electric energy source 12. The other pole is connected to the first pole wire 16a of the first flash bulb 9a. Main wires 25a and 25b interconnect the bulbs in FIGS. 3, 4, 7, and 8.

After closing the switch 19 the first flash bulb 9a is ignited, its ignition wire 15 being fused. In order to ignite the next flash bulbs 9b, 9c, and so on, an electric connection must be made from the first pole wire 16a of the flash bulb 9b to the first pole wire 16b of the flash bulb 9b, and so on. This is effected by means arranged in the envelope 13, which, under the influence of the heat and light and gas pressure, respectively, formed during the burning of each flash bulb, establishes an electric contact between the first pole wire 16 and the additional electrode 18.

For this purpose the flash bulb 9a includes at the first pole wire 16a, a drop 20 of low-melting-point metal, for example, Wood's metal having a melting point of approximately 70° C. which may consist of two parts of tin, two parts of cadmium, four parts of lead and one part of bismuth. During burning of the flash bulb 9a, the drop is melted and flows between the first pole wire 16a and the additional electrode 18a thus forming there an electric contact between the said two wires. In FIG. 4, the flowed contact metal is denoted by 21. Now the first pole wire 16b of the flash bulb 9b is connected to the energy source 12 through the additional electrode 18a, the contact metal 21 and the first pole wire 16a of the flash bulb 9a. So the flash bulb 9b can be ignited.

By way of example, the flash bulb 9b is provided with a different contact means which consists of a non-conductive mass 22 provided on the inside of the envelope. This mass connects the first pole wire 16b and the additional electrode 18b and which becomes permanently electrically conductive after the action of heat upon it as a result of the ignition of the flash bulb 9b, (approximately 4000° C.). The non-conductive mass 22 may alternatively consist of photosensitive material which becomes permanently electrically conductive by the strong action of light occurring during the ignition of the flash bulb. The contact mass which has become conductive is denoted by 23 in FIG. 4. The heat-sensitive or photosensitive masses may alternatively be provided on the outside of the bulb, if desired. As heat-sensitive or photosensitive masses, known noble metal compounds, which react both to heat and to light may be used if desired. FIG. 7 shows a series of 9b bulbs as described above, and FIG. 8 shows a similar series of 9a bulbs.

Through the contact mass 23, the following flash bulb 9c is also connected to the energy source 12. According to a further embodiment of the invention the contact means in this bulb consists of a thin metal tube 24 of a high melting-point material which is secured to the first pole wire 16c, and surrounds the additional electrode 18c with a small gap. The tube is sealed in the wall of the bulb and is closed at its inner end. Under the action of the gas pressure occurring during the burning of the flash bulb 9c at which an excessive pressure of approximately 10 atmosphere is formed, the metal tube 24 is compressed and contacted with the additional electrode 18c. FIG. 4 shows the compressed metal tube 24 with the clamped additional electrode 18c. As a result of this, a connection is made to the following flash bulb.

It is to be noted that the flash bulbs described may also be used separately in the conventional manner in holders provided for this purpose.

In case the flash unit is to be used in combination with a camera, the holder 3 is provided with contact 5, a contact nipple 25 on supporting plate 6 for receiving a coaxial plug 26 of a two-wire camera synchronous cable 27. This cable is shown in FIG. 1 by broken lines and the second coaxial plug 28 is connected in the flashlight contact nipple 4 of the camera 1. In this case, the electric energy source 12 on the supporting plate 6 may be omitted and be accommodated in the synchronous cable 27 (FIG. 5). Here the electric energy source 29, for example, a dry battery is accommodated together with a charging capacitor 30 in a housing in the synchronous cable 27; the battery 29 is interchangeable.

Figure 6:
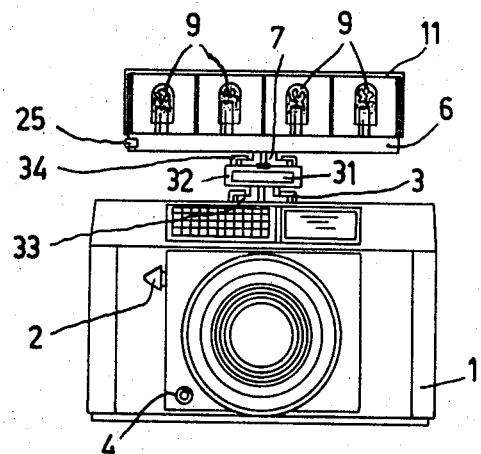
FIG. 6 shows, like FIG. 1, a camera with a flash unit according to the invention with a battery adapter.

The electric energy source for igniting the flash bulbs 9 may alternatively be housed in the camera, for example, as an interchangeable dry battery or as a piezo-electric element. If neither the camera, nor the supporting plate 6 for the flash bulbs can be provided with an electric energy source, a battery 31 may be supported in an adapter 32 which is provided with a slide 33 for securing to the holder 3, and with a holder 34 for receiving the slide 7 of the flash bulb support 6 (FIG. 6).

What is claimed is:
1. A flash unit comprising:
 (a) a base,
 (b) a plurality of ignitable flash lamps carried by the base, each lamp comprising a sealed bulb and including therein ignition means having first and second pole wires bridged by an ignition wire and an additional electrode wire electrically connectable to said first pole wire, each of the three wires having one end extending outside the bulb, with gas pressure developing inside the bulb during flashing of the lamp.
 (c) first circuit means on the base for electrically joining the second pole wires of each lamp,
 (d) second circuit means on the base for serially, electrically joining the electrode wire of each lamp to the first pole wire of an adjacent lamp, and
 (e) junction means secured to the first pole wire near its junction with the ignition wire within each bulb and comprising a tube spaced from the other pole wire and generally surrounding the electrode wire within the bulb, said junction means being sufficiently responsive to pressure within the bulb from the flashing of that lamp, to compress the tube and thereby to contact and mechanically and electrically join said first and electrode wires, partially completing the circuit for ignition of an adjacent lamp.

2. Apparatus as defined in claim 1 wherein the bulbs are arranged along a substantially straight line on the base.

3. Apparatus as defined in claim 2 for use with a camera, further comprising means for securing the apparatus to the camera, and connection means for actuating said apparatus in response to shutter release of the camera.

References Cited

UNITED STATES PATENTS

| | | | |
|---|---|---|---|
| 3,443,875 | 5/1969 | Herrmann | 431—95 |
| 3,459,487 | 8/1969 | Glenn | 431—95 |
| 3,459,488 | 8/1969 | Schroder | 431—95 |
| 2,725,821 | 12/1955 | Coleman | 200—118UX |
| 2,762,889 | 9/1956 | Waller | 200—142 |
| 3,248,504 | 4/1966 | McGirr et al. | 200—142 |
| 2,290,309 | 7/1942 | Aquilla | 431—93 |

FOREIGN PATENTS 1,192,047   4/1965   Germany ———— 240—1.3

EDWARD J. MICHAEL, Primary Examiner

U.S. Cl. X.R.

240—1.3